United States Patent [19]
Luke, Jr.

[11] Patent Number: 5,303,154
[45] Date of Patent: Apr. 12, 1994

[54] CONTINUOUS ON-LINE COMMUNICATIONS SYSTEM FOR AUTOMATIC GUIDED VEHICLES

[76] Inventor: Walter Luke, Jr., R.D. #2, Box 136C, Binghamton, N.Y. 13903

[21] Appl. No.: 782,687

[22] Filed: Oct. 25, 1991

[51] Int. Cl.⁵ .............................................. B60Q 1/00
[52] U.S. Cl. ........................ 364/424.02; 364/424.02; 364/424.03; 340/438; 340/460
[58] Field of Search ...................... 364/424.01, 424.02, 364/424.03, 436, 449, 478, 461, 468; 318/587, 591; 180/167, 168, 169; 340/460, 438; 414/664, 495

[56] References Cited

U.S. PATENT DOCUMENTS

| | | | |
|---|---|---|---|
| 4,076,414 | 2/1978 | Tulbert | 355/38 |
| 4,190,220 | 2/1980 | Hahn et al. | 246/182 |
| 4,729,449 | 3/1988 | Holmquist | 180/168 |
| 4,792,995 | 12/1988 | Harding | 455/606 |
| 4,935,871 | 6/1990 | Gröhsmeyer | 364/424.02 |
| 4,987,540 | 1/1991 | Luke, Jr. | 364/424.02 |
| 4,993,507 | 2/1991 | Ohkura | 180/168 |
| 5,127,486 | 7/1992 | Yardley et al. | 180/168 |
| 5,163,001 | 11/1992 | Luke, Jr. | 364/424.02 |
| 5,164,985 | 11/1992 | Nysen et al. | 380/9 |
| 5,175,480 | 12/1992 | McKeeferey et al. | 318/587 |
| 5,187,664 | 2/1993 | Yardley et al. | 364/424.02 |

Primary Examiner—Thomas G. Black
Assistant Examiner—Jacques H. Louis-Jacques
Attorney, Agent, or Firm—Salzman & Levy

[57] ABSTRACT

The present invention features a method and circuit for ensuring substantially continuous, on-line communications for a vehicle that is directed to travel along one of a plurality of closed loop guide paths. The system includes a signal generator, and a first buffer operatively connected to the signal generator and to a first guide member defining one of the plurality of closed loop guide paths. The generator and first buffer provide a first reference signal at a predetermined frequency. A second buffer is operatively connected to the signal generator and to a second guide member defining a second guide path. The second buffer provides a second signal at the predetermined frequency. Connected to the second buffer is a mechanism for shifting or time delaying the second signal relative to the first reference signal, as a periodic function of time. In this way, destructive coupling of signals provided in each of the guide members in their respective guide paths is substantially eliminated and constructive coupling of signals provides enhanced effective signal amplitude to the vehicle.

18 Claims, 4 Drawing Sheets

CONTINUOUS ON-LINE COMMUNICATIONS SYSTEM FOR AUTOMATIC GUIDED VEHICLES

FIELD OF THE INVENTION

The present invention relates to a closed loop path inductive communications systems for automatic guided vehicles and, more particularly, to a method and apparatus for ensuring continuous, on-line communications for automatic guided vehicles moving along a path.

BACKGROUND OF THE INVENTION

Automatic guided vehicles (AGVs) often receive communications from a buried wire disposed along a guide path. This type of communications system is inductive. With more sophisticated AGVs, however, both guide path information and communications information must be transmitted to and from the vehicle from remote locations. Two or more floor loops are often provided for carrying such signals independently to or from the AGV. Each floor loop has an oscillator which generates a signal at a predetermined frequency. Unfortunately, when the floor loops intersect with one another, there is a potential for both the guidance and the communications signals to destructively interfere or otherwise cancel each other. This can result in a loss of communications that is detrimental to overall system operations.

An AGV system using inductive communications is shown and described in U.S. Pat. No. 4,987,540, issued to Walter Luke, Jr., on Jan. 22, 1991, entitled: "AUTOMATIC GUIDED VEHICLE SYSTEM HAVING COMMUNICATION AND TRAFFIC CONTROLLER WITH UNGUIDED PATHS," the teachings of which are herein incorporated by way of reference.

While elaborate schemes have been suggested for separating the guide path and communications signals, and for reducing the likelihood of destructive interference between them, no practical solution has yet been found.

It would therefore be advantageous to provide a system for decreasing, or eliminating the likelihood of destructive interference between two signals in an automatic guided vehicle inductive communications system.

It would also be advantageous to provide a fool proof and simplified automatic guided vehicle inductive communications system.

It would also be advantageous to minimize the likelihood of inadvertent potential for destructive signal interference in an inductive communications system for AGVs to a short duration, i.e., on the order of milliseconds.

SUMMARY OF THE INVENTION

In accordance with the present invention, there is provided a method and circuit for ensuring substantially continuous, on-line communications for a vehicle that is directed to travel along one of a plurality of closed loop guide paths. The system includes a signal generator and a first buffer operatively connected to the signal generator and to a first guide member defining one of the plurality of closed loop guide paths. The generator and first buffer provide a first reference signal at a predetermined frequency. A second buffer is operatively connected to the signal generator and to a second guide member defining a second guide path. The second buffer provides a second signal at the predetermined frequency. Connected to the second buffer is a mechanism for shifting or time delaying the second signal relative to the first reference signal, as a periodic function of time. In this way, destructive coupling of signals provided in each of the guide members in their respective guide paths is substantially eliminated and constructive coupling of signals provides enhanced effective signal amplitude to the vehicle.

BRIEF DESCRIPTION OF THE DRAWINGS

A complete understanding of the present invention may be obtained by reference to the accompanying drawings, when considered in conjunction with the accompanying detailed description, in which.

DESCRIPTION OF THE PREFERRED EMBODIMENT

Generally speaking, the invention features an inductive communication and guide path system for AGVs that is substantially free from destructively coupled guide path signals provided by crossing guide path guide members.

Figure 1:
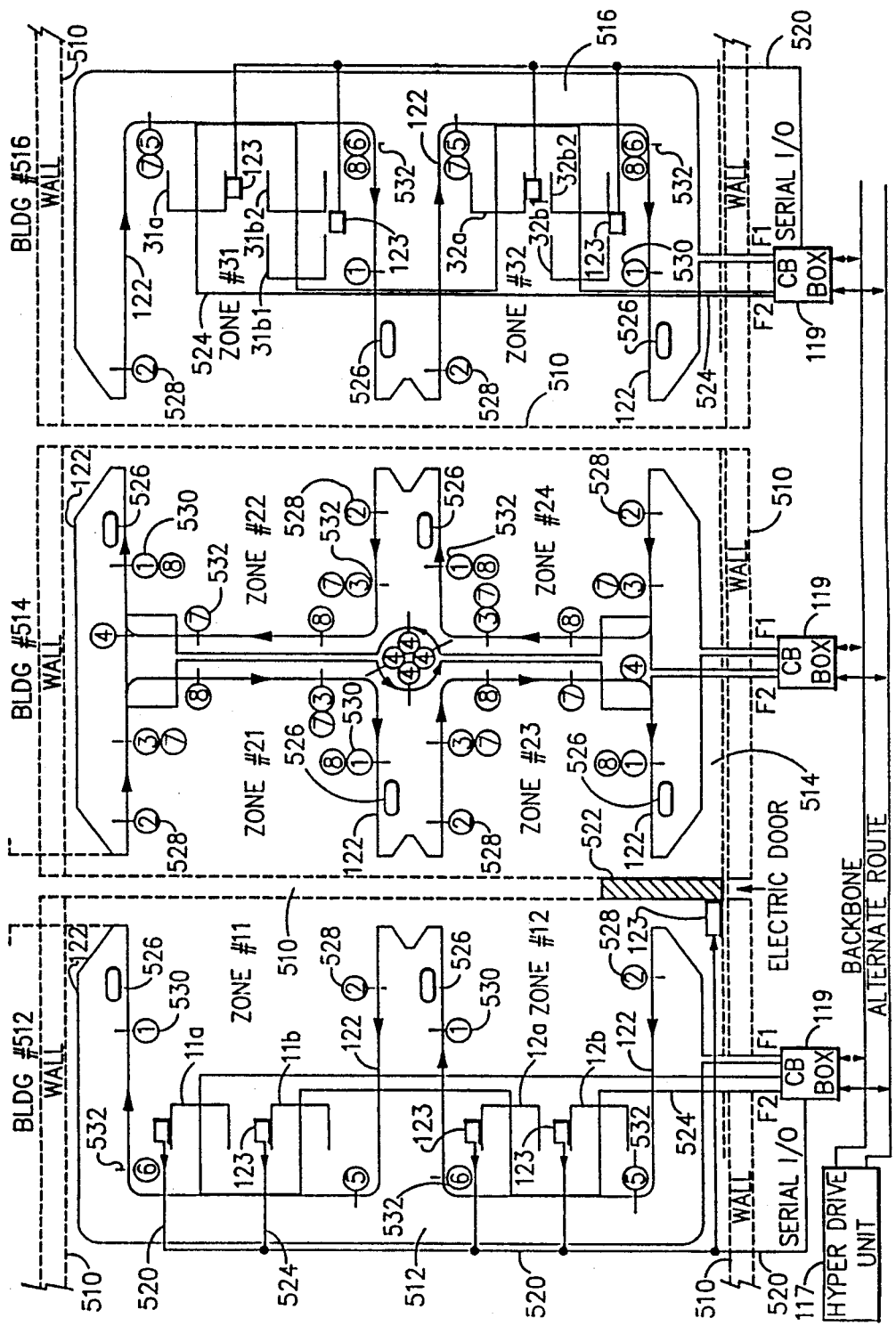
FIG. 1 is a diagrammatic view of a wiring layout of an exemplary floor plan of an AGV communications system, including a plurality of communications and traffic control boxes, which exemplary floor plan can be utilized with the inductive communications system of the present invention.

Referring now to FIG. 1, there is shown a communications and guide path wiring layout of an exemplary floor plan of a warehouse that can be utilized with the communications circuit of the present invention.

In the floor plan depicted in FIG. 1, walls are shown in phantom and identified as reference numeral 510. Interior walls 510 separate buildings of a warehouse facility. The buildings are arbitrarily divided into two or four arbitrarily numbered, logical zones in the preferred embodiment. It is to be understood, however, that other zone configurations and zone numbering systems can also be used with the present inventive system, as befits the spirit and scope thereof.

Building 512 is partitioned into logical zones 11 and 12; building 514 is partitioned into zones 21 through 24; and building 516 is partitioned into zones 31 and 32.

Each zone may contain any number of pick-up and delivery (P & D) stands, that are accessible by an AGV, travelling along guide path 122. Moreover, a specified zone (e.g., zone 23) may contain no P & D stands. Zone 11, by way of example, has two P & D stands identified by reference numerals 11a and 11b. Zone 31 has two P & D stands identified by reference numeral 31a (representing a conventional one-position P & D stand), and reference numerals 31b1 and 31b2 (representing a two-position P & D stand).

Associated with each P & D stand is a serial box 123 for detecting the presence or absence of a load on the corresponding P & D stand. The load status of each P & D stand is communicated to the communications box (CB) 119 responsible for controlling traffic and communications for the respective zone over serial I/O signal line 520. This P & D communications network ensures that an AGV does not attempt to deliver a load to a designated P & D stand that cannot accept it.

Serial I/O signal line 520, connected to CB 119, is also used to communicate with and/or activate other serial boxes 123, such as that associated with an electric door 522 or with other special purpose devices, such as: electric lights, audible signals, HVAC units, etc., not shown.

Guide path 122 has an electric cable buried in the warehouse floor in the preferred embodiment. Signals are inductively transferred between AGV and control devices 119 and 117 by means of guide path cables having a carrier signal frequency F1. Another carrier signal frequency F2 can be used to transfer signals inductively from an off-path buried cable 524, which can facilitate traffic control near P & D stands and other geographic features located along guide path 122.

Also disposed in the warehouse floor are exit transponders 526 such as those manufactured by Namco, Inc. as Model No. SN 110-10000. Transponders 526 indicate to the AGV that it is leaving a given zone. The AGV communicates this fact to CB 119.

Similarly, entrance transponders 528 buried in the warehouse floor indicate when an AGV is entering a given zone or building.

An unguided path for AGVs travelling between zones or buildings is defined by an unguided portion of the warehouse floor disposed between an exit transponder 526 and its corresponding entrance transponder 528. Once the speed and direction (steering) of an AGV is set, the AGV system can be programmed to sense a signal generated by the AGV in response to an exit transponder 526 and to anticipate the arrival of the AGV at a destination entrance transponder 528 a predetermined time later. This arrival is anticipated, irrespective of an intervening unguided path. Typically, the unguided portion of the vehicle path is between 8 and 18 inches (the thickness of a wall). Theoretically, however, any distance can be negotiated by an AGV of this invention, without guidance as long as the aforementioned initial AGV parameters are known.

Also buried in the warehouse floor along guide path 122 adjacent exit transponders 526, are sensors, such as magnetic sensors 530, electrically connected to CB 119 for providing a redundant indication that an AGV is leaving a zone or building.

Decision sensors or transponders 532 are located along guide path 122 at intersections and curves in the path for signalling to an AGV that a change of direction or other operating characteristic (e.g., speed, lights, horn) is appropriately required.

From the foregoing description, it is clear that the communications network shown in FIG. 1, which includes, but is not limited to: CB 119, guide path 122, serial boxes 123 and transducers and sensors 526, 528, 530, 532, respectively, allow the AGV system to transfer both communications data (i.e., communications information and traffic control information) and vehicle guidance signals between AGVs and control devices 117, 119 in the system. Moreover, one or more of a group of functions can be performed by AGVs in the system upon being initiated from remote locations. The aforementioned AGV functions can be initiated at predetermined times or at times calculated as a function of traffic conditions, among other conventional factors.

Figure 2:
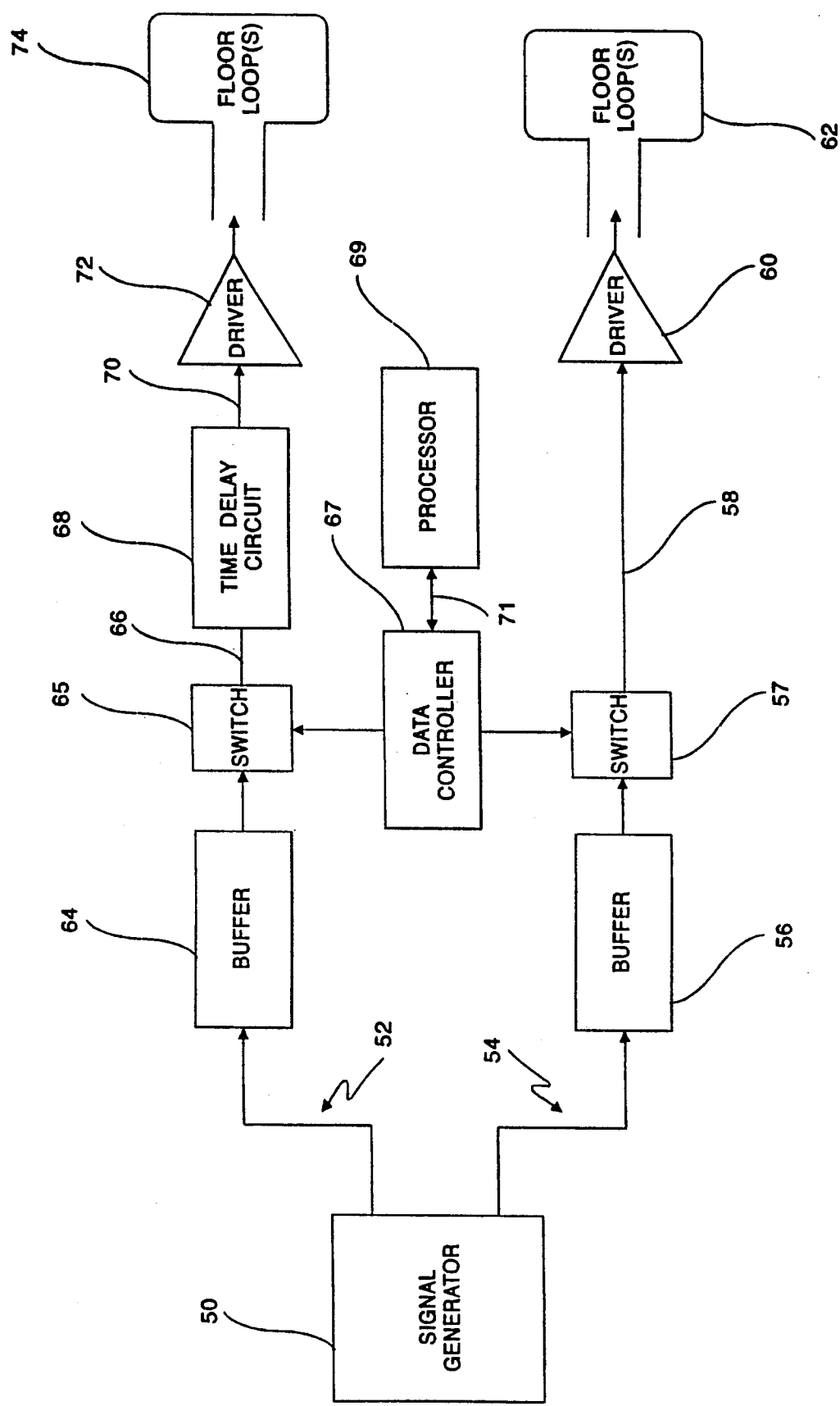
FIG. 2 is a block diagram of an inductive communications circuit for AGVs, in accordance with the present invention.

Referring now to FIG. 2, there is shown a block diagram of an inductive communications circuit for utilization in a communications and guide path floor plan of a warehouse, as typically shown in FIG. 1. A signal generator 50 for providing a predetermined time base (frequency) is connected to two or more guide paths, shown generally in this figure as reference numerals 52 and 54. A typical operating frequency for signal generator 50 would be 500 kHz. A first buffer 56 for isolating generator 50 from the remainder of guide path 52 is connected to signal generator 50. The signal of predetermined frequency, as presented at the output of buffer 56, is applied over line 58 to one or more drivers 60 which, in turn, are connected to a floor loop or loops 62.

Similarly, a second buffer 64 is connected to signal generator 50 for providing a signal having the same predetermined frequency. Connected to buffer 64, over line 66, is a signal shifting or time delaying circuit 68, described in greater detail hereinbelow, with reference to FIGS. 3a and 3b. The output of time delaying circuit 68 is applied over lines 70 to one or more drivers 72 which are, in turn, connected to another floor loop or loops 74. Of course, buffers 56 and 64 can be combined into one buffer in alternate embodiments, but there are advantages to providing isolation between floor loop circuits.

Disposed between buffer 56 and driver 60 as well as between buffer 64 and time delay circuit 68, are switches 57 and 65, respectively, for connecting the output of respective buffers to the following circuitry in circuits 54 and 52, respectively. Switches 57 and 65 are connected to and actuated by a data controller 67. Data controller 67 is also connected to a processor 69, over a data communications interface 71, such as an R-232 interface. Processor 69 forms no part of the present invention.

When instructed by processor 69, data controller 67 actuates both switches 57 and 65 simultaneously, allowing the signal to be applied to driver 60 and time delaying circuit 65, respectively.

Figure 3A:
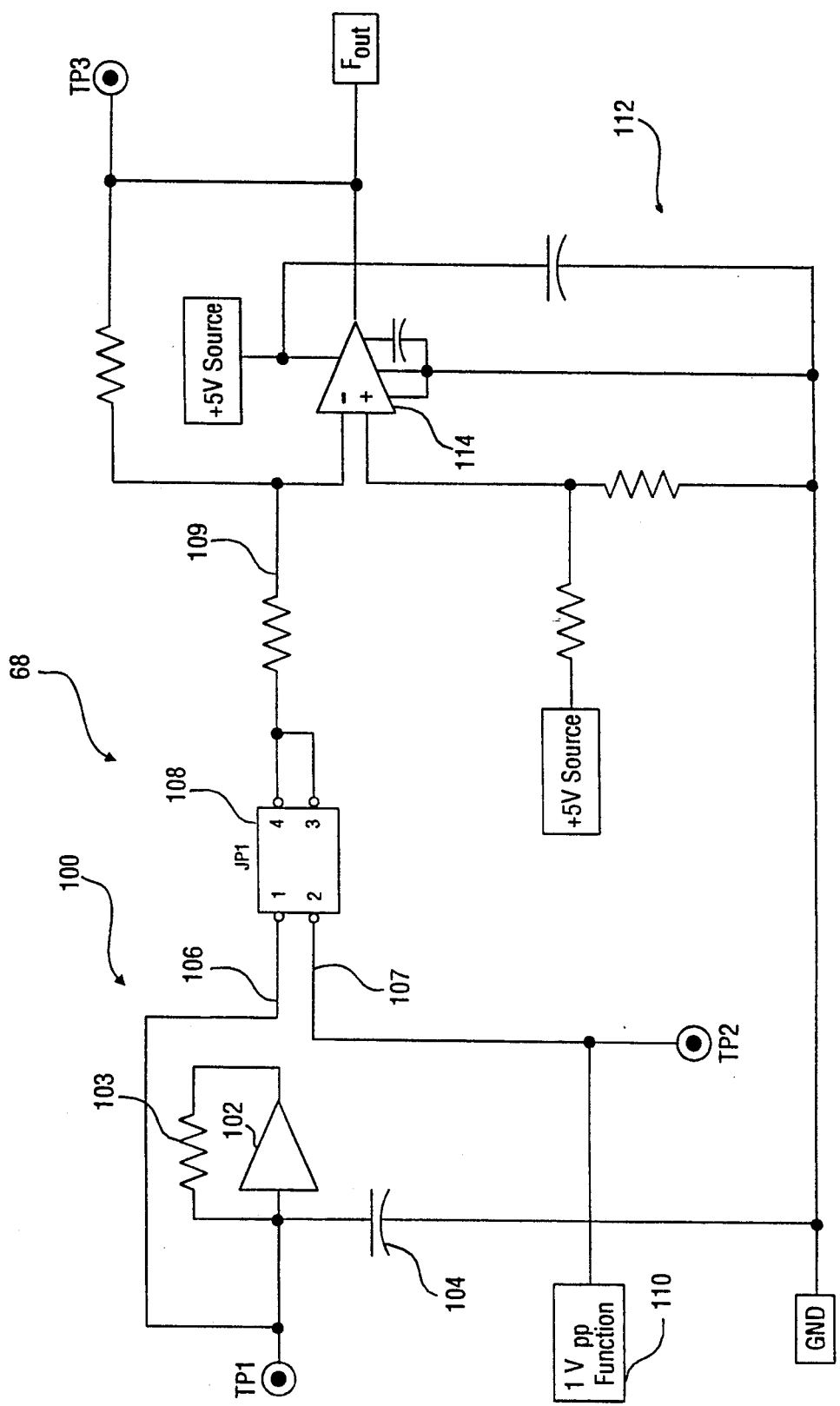
FIGS. 3a and 3b, taken together, are a schematic diagram of the signal shifting circuit identified in the inductive communication circuit diagram, shown in FIG. 2.
Figure 3B:
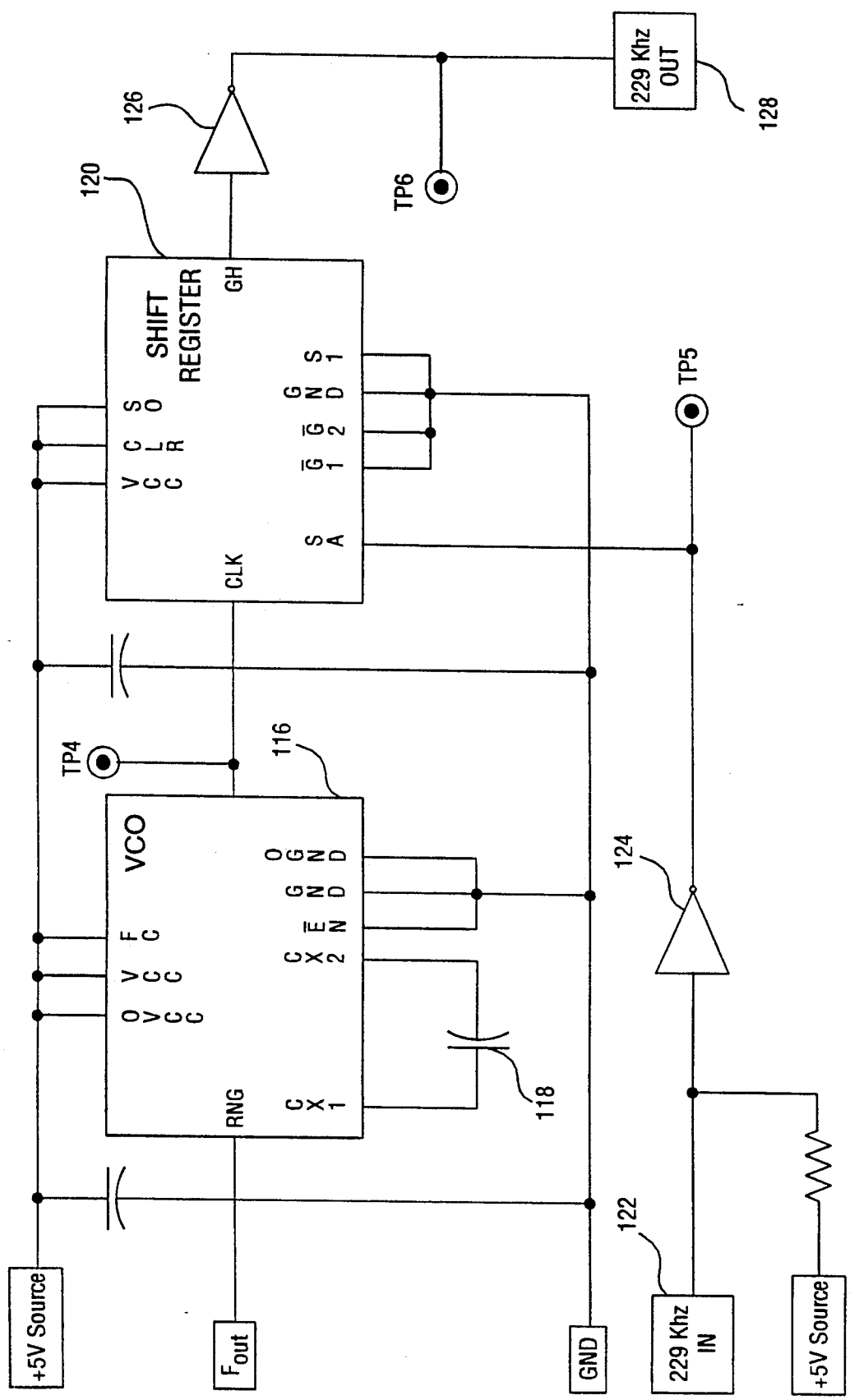

Referring now to FIGS. 3a and 3b, there is shown a schematic diagram of a circuit of the preferred embodiment for ensuring continuous on-line communications for the communications and guide path system for AGVs. The first part of the circuit 100 is an internal function generator which generates a function, such as an exponential ramp, subsequently used to generate a variable delay. A CMOS inverter 102, configured in this circuit as an astable multivibrator, generates a periodic exponential output, determined by the size of resistor 103, and capacitor 104. CMOS inverter 102 operates off +5 volts and ground. When the output of inverter 102 is at +5 volts, capacitor 104 is charged through resistor 103 and the capacitor voltage rises exponentially to the threshold range of the input inverter 102, typically 2.5 to 3 volts. As the input of inverter 102 reaches 2.5 to 3 volts, representing a logical "1", the output of inverter 102 switches to a logical "0" (zero volts). Capacitor 104 then discharges through resistor 103 towards ground. In the process of discharging to resistor 103, the voltage drops to the lower threshold for the inverter 102 (approximately 1.5 to 2 volts) and causes the output of inverter 102 to switch to 5 volts. This process is repeated indefinitely. A ramp signal is generated along line 106 to a jumper 108 which can be configured by hardware to receive the ramp signal from line 106 or from another source, described hereinbelow.

An external modulation function 110 is provided by a function generator, not shown, having a one volt peakto-peak range. The one volt peak-to-peak range is selected to match the voltage of the internal function generator 100. The external modulation function 110 is applied to jumper 108 over line 107 and can be any reasonable periodic function, such as but not limited to a triangle, sine, ramp, or pulse function.

Once the function (i.e., either the internal function 100 or the external modulation function 110) has been selected, jumper 108 provides a signal applied to line 109 and amplified by an amplification circuit shown generally at reference numeral 112. In this way, the signal generated by internal function 100 or external modulation function 110, originally in the range of one volt peak-to-peak, is now amplified to a range of 0 to 5 volts by amplification circuit 112. Amplification circuit 112 includes an operational amplifier 114, tied to a +5 volt source and to ground, in a conventional manner. In the preferred embodiment, amplifier 114 is Model No. CA3160, manufactured by RCA Corp. $F_{out}$, the signal generated by amplifier 114, is now held between 0 and 5 volts to guarantee that this signal is within the TTL or digital range for further processing.

Signal $F_{out}$ is applied to a voltage controlled oscillator (VCO) 116 (FIG. 3b), such as Model No. 74LS624 manufactured by Motorola Company. A capacitor 118 is connected to VCO 116 for establishing the free running frequency of the voltage controlled oscillator (i.e., its oscillating frequency in the absence of any signal $F_{out}$). Operatively connected to VCO 116 is a shift register 120. An independent signal at reference numeral 122 is applied to a buffer/inverter 124, the output signal of which is then applied to shift register 120. In order for the phase of the output signal at reference numeral 128 to be consistent with the phase of input signal 122, another inverter 126 is disposed downstream from shift register 120.

When this free running frequency is high, the delay between the shift register 120, and VCO 116 to which it is connected, is negligible. The output waveform is effectively in phase with the input waveform. When this VCO frequency is low, however, a substantial amount of time is required to get from the input of shift register 120 to the output of shift register 120, causing a significant phase shift between the output signal 128 and the independent input signal 122. The frequency of oscillation of VCO 116 is high (typically greater than 10 Mhz), when the voltage of $F_{out}$ is low (approaching 0). The frequency of oscillation of VCO 116 is low as the amplitude of $F_{out}$ is high (approaching 5 volts). Therefore the frequency of oscillation is inversely proportional to the amplitude of $F_{out}$. At the typical operating frequency of 500 kHz provided by signal generator 50, the time delaying circuit 68 delays the output signal by 1 microsecond (approximately one half of the period (T) of the 500 kHz frequency).

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. An inductive communications and guide path system for automatic guided vehicles (AGVs) that provides substantially continuous on-line communications for an AGV proximate one of its guide paths, comprising:

means defining at least two continuous, closed loop guide paths for AGVs;

signal generating means operatively connected to said at least two continuous, closed loop guide paths;

buffer means operatively connected to said signal generating means and to each of said at least two continuous, closed loop guide paths for providing a first, or reference signal at a predetermined frequency and for providing a second signal at said predetermined frequency; and means operatively connected to said buffer means for shifting or time delaying said second signal relative to said first signal as a periodic function of time, whereby destructive coupling of said first and second signals provided in respective ones of said guide paths is substantially eliminated.

2. The inductive communications and guide path system for automatic guided vehicles in accordance with claim 1, wherein one of said guide paths comprises a guidance wire.

3. The inductive communications and guide path system for automatic guided vehicles in accordance with claim 2, wherein each of said guide paths comprises a communications wire.

4. The inductive communications and guide path system for automatic guided vehicles in accordance with claim 1, wherein said means for shifting or time delaying said second signal comprises means for delaying said signal inversely proportionally to a predetermined external modulation function.

5. The inductive communications and guide path system for automatic guided vehicles in accordance with claim 4, wherein said means for shifting or time delaying said second signal comprises a voltage controlled oscillator.

6. The inductive communications and guide path system for automatic guided vehicles in accordance with claim 4, wherein the frequency of said predetermined external modulation function is lower than said predetermined frequency.

7. The inductive communications and guide path system for automatic guided vehicles in accordance with claim 1, wherein said means for shifting or delaying said second signal comprises means for delaying said signal inversely proportionally to a predetermined internally generated function.

8. The inductive communications and guide path system for automatic guided vehicles in accordance with claim 7, wherein said internally generated function is generated by an astable multivibrator, and further wherein said generated function is exponential.

9. A method for ensuring substantially continuous on-line communications for an automatic guided vehicle (AGV) moving along a guide path in an inductive communications and guide system, comprising the steps of:

a) generating a first signal;

b) receiving said first signal and generating a reference signal in response thereto at a predetermined frequency;

c) receiving said first signal and generating a second signal in response thereto at said predetermined frequency; and d) shifting or time delaying said second signal relative to said reference signal as a periodic function of time, whereby destructive coupling between said second and reference signals is substantially eliminated.

10. The method for ensuring substantially continuous on-line communications in accordance with claim 9, wherein said reference signal comprises a guidance signal.

11. The method for ensuring substantially continuous on-line communications in accordance with claim 10, wherein said second signal comprises a communications signal.

12. The method for ensuring substantially continuous on-line communications in accordance with claim 9, wherein said step (d) of shifting or time delaying said second signal delays said second signal inversely proportionally to a predetermined external modulation function.

13. The method for ensuring substantially continuous on-line communications in accordance with claim 12, wherein said predetermined external modulation function has a frequency that is lower than said predetermined frequency.

14. The method for ensuring substantially continuous on-line communications in accordance with claim 9, wherein said step (d) of shifting or delaying said second signal delays said signal inversely proportionally to a predetermined internally generated function.

15. The method for ensuring substantially continuous on-line communications in accordance with claim 14, wherein said internally generated function is exponential.

16. An inductive communications and guide path system for automatic guided vehicles (AGVs) that provides enchanced on-line communications for an AGV proximate one of its guide paths, comprising:
 means defining at least two continuous, closed loop guide paths for AGVs;
 signal generating means operatively connected to said at least two continuous, closed loop guide paths;
 buffer means operatively connected to said signal generating means and to each of said at least two continuous, closed loop guide paths for providing a first, or reference signal at a predetermined frequency, and for providing a second signal at said predetermined frequency; and
 means operatively connected to said buffer means for shifting or time delaying said second signal relative to said first signal as a periodic function of time, whereby constructive coupling of said first and second signals provides enhanced effective signal amplitude to said AGVs.

17. The inductive communications and guide path system for automatic guided vehicles in accordance with claim 16, wherein one of said guide paths comprises a guidance wire.

18. The inductive communications and guide path system for automatic guided vehicles in accordance with claim 17, wherein each of said guide paths comprises a communications wire.

* * * * *